Aug. 1, 1961  F. SOLOMON ET AL  2,994,729
ELECTROCHEMICAL BATTERY AND NEGATIVE ELECTRODE THEREFOR
Filed Nov. 7, 1957
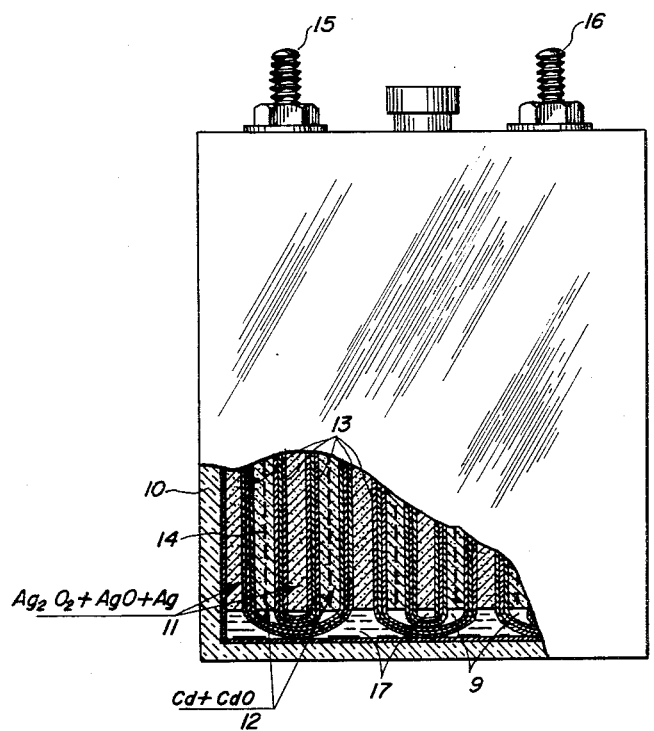
INVENTORS:
FRANK SOLOMON
ROBERT F. ENTERS
BY
AGENT

United States Patent Office 2,994,729
Patented Aug. 1, 1961

2,994,729
ELECTROCHEMICAL BATTERY AND NEGATIVE ELECTRODE THEREFOR

Frank Solomon, Lake Success, N.Y., and Robert F. Enters, Hackensack, N.J., assignors to Yardney International Corp., New York, N.Y., a corporation of New York
Filed Nov. 7, 1957, Ser. No. 695,160
9 Claims. (Cl. 136—24)

This invention relates to electrochemical batteries, more particularly to batteries of the silver-cadmium type as disclosed in our co-pending application Ser. No. 530,355 and now abandoned, filed August 24, 1955, of which the present application is a continuation-in-part.

As taught in our co-pending application, a silver-cadmium battery, rechargeable over a large number of cycles, requires the interposition of a semi-permeable separator (such as a sheet of polyvinyl alcohol or regenerated cellulose) between its positive and negative electrodes for the purpose of forming discrete electrolyte compartments around these electrodes, the electrolytic solutions in these compartments being prevented by the separators from freely mixing with one another. Although silver oxide is regarded as but slightly soluble in concentrated alkaline solutions, we have nevertheless found that the barring of the silver ions from the vicinity of an active negative mass protects the cadmium electrodes from premature deterioration and enables the complete or almost complete elimination of the usual inert supporting structure from the latter.

With the negative electrodes thus consisting entirely or almost entirely of active material, it behooves to provide a substantial excess of cadmium over the electrochemical equivalent of the silver (or other positive active material) so that, as likewise disclosed in our co-pending application, a core of metallic cadmium will be present even in the fully discharged condition of the battery or cell. This metallic core serves the dual function of mechanically supporting an active mass of cadmium oxide, which constitutes a major part of the negative electrode in the discharged state, and of acting as a current conductor for this mass.

The general object of our present invention is the provision of an even further improved cell or battery of the character described in which the advantages of lower weight and reduced bulk, afforded by the suppression of an inert supporting structure in the negative electrode or electrodes, are realized to a still greater extent.

A more particular object of this invention is the attainment of the aforestated advantages through a reduction in the amount of excess cadmium required for the negative electrode or electrodes.

It is also an object of our present invention to provide a novel and improved negative electrode for electrochemical batteries or cells in which the cadmium-containing active mass constitutes a very large proportion (at least 90% by weight) of the electrode material and which retains a high degree of mechanical stability and electrical conductivity when the active mass is fully or almost fully discharged.

Such a negative electrode essentially consists, in accordance with a feature of our invention, of a compacted comminuted mass which contains at least 90%, by weight, of active material (cadmium and/or cadmium oxide), at least 2% but not more than 10% of silver powder and preferably a small proportion, e.g. from ¼% to 1%, of a thermoplastic binder such as polyvinyl alcohol.

The sole FIGURE of the accompanying drawing is an elevational view (parts broken away) of an electrochemical battery embodying our invention.

The battery shown in the drawing comprises a casing 10, a plurality of positive electrodes 11, a plurality of negative electrodes 12 alternating with the positive electrodes, and layers 13 of semi-permeable separator material between adjacent electrodes of opposite polarity. The electrode assembly 11—12—13 is permeated by an alkaline electrolyte 17, such as a 30% to 50% aqueous solution of potassium hydroxide, which is confined by the separators 13 in positive and negative electrolyte compartments surrounding the respective electrodes.

The positive electrodes 11 advantageously consist of sintered silver, with or without an imbedded metallic support, which in the charged state of the battery is substantially entirely oxidized to silver oxide and/or peroxide. The separator layers 13 may be semi-permeable sheets of cellulosic or thermoplastic material, such as cellophane or polyvinyl alcohol, and advantageously incorporate an ion exchanger for the purpose of reducing their apparent electrical resistance and increasing their ability to repel silver ions and to resist penetration thereby.

The negative electrodes 12 shown in the drawing are rectangular plates of compacted comminuted material preferably prepared in the following manner:

945 parts of cadmium oxide (CdO) in finely powdered form are mixed with 50 parts of a commercial grade of silver powder until the latter is uniformly distributed throughout the cadmium-oxide mass. To this mixture we add 5 parts of polyvinyl alcohol in aqueous solution, this solution being allowed to penetrate thoroughly into the powdered material. After the mix has dried, half of it is placed in a die cavity; next, a current-collecting member in the form of a silver grid, wire loop or the like, indicated in the drawing by dotted lines 14, is placed in the die cavity whereupon the remainder of the mix is added. The collector 14 has a terminal lead (not shown) extending from it toward negative terminal 15 as is well known per se, the positive terminal 16 is connected to the plates 11. The entire mass with the imbedded collector is then compressed at pressures ranging between approximately .75 and 3 tons per cm.$^2$. In cycling, the cadmium-containing active material of these plates is partly converted, in the discharged state of the batteries, into cadmium hydroxide as is well known per se. The resulting plate 12 is then placed in the casing 10 as part of the electrode assembly shown in the drawing and is charged prior to use.

It is to be understood that the current collector 14 contributes only to a minor extent to the mechanical stability of the electrode, in contradistinction to the conventional electrode supports (generally of nickel) having pockets to receive the active cadmium-containing material. This collector, accordingly, constitutes only a small portion of the electrode body, accounting for preferably not more than 5 percent of its weight.

The relatively high overvoltage of silver toward hydrogen in alkaline solutions minimizes gassing, thus avoiding disruption of the electrode structure during the charging process.

It will be appreciated that the desired separation of the negative and the positive electrolyte compartments may be achieved by wrapping the separator sheets 13 about the electrodes of either polarity or by partitioning the interior of casing 10 with the aid of this separator, as by pleating the separator in zig-zag fashion in the manner described in pending applications Ser. No. 356,200, filed May 20, 1953, by Jacob J. Bikerman, now Patent No. 2,851,511, and Ser. No. 467,076, filed November 5, 1954, by Renato Di Pasquale and Charles Gold, now Patent No. 2,851,509. Other modifications of the specific arrangement shown and described will also be readily apparent to persons skilled in the art and may be adopted

We claim:

1. An electrode for electrochemical batteries, comprising a compacted comminuted mass composed to an extent of not less than substantially 90%, by weight, of an active material selected from the group which consists of cadmium and cadmium oxides and hydroxides, said mass further containing silver powder admixed with said active material, said silver powder being present in an amount ranging between substantially 2% and 10%, by weight, of said mass.

2. An electrode according to claim 1, further comprising a thermoplastic binder distributed through said mass.

3. An electrode according to claim 2, wherein said binder is present in an amount ranging between substantially ¼% and 1% of said mass.

4. An electrode according to claim 2, wherein said binder consists of polyvinyl alcohol.

5. An electrochemical cell comprising a negative electrode with a cadmium-containing active material and a positive electrode including silver as an active material, said negative electrode further containing comminuted silver, the comminuted silver being present in an amount ranging between substantially 2% and 10%, by weight, of said cadmium-containing active material homogeneously dispersed therethrough.

6. A cell according to claim 5, wherein the cadmium and the silver form part of a comminuted, compacted mass constituting at least a major portion of the body of said negative electrode.

7. A cell according to claim 6, wherein said negative electrode further comprises a thermoplastic binder permeating said compacted mass.

8. An electrochemical battery comprising at least one positive electrode, at least one negative electrode, an alkaline electrolyte surrounding said electrode, and semi-permeable separator means confining said electrolyte in separate compartments respectively enclosing said positive and said negative electrode, said negative electrode including a homogeneous mixture of a comminuted cadmium-containing active material and silver powder, said silver powder being present in an amount ranging between substantially 2% and 10%, by weight, of said mixture, said positive electrode including an active material selected from the group which consists of silver and silver oxides.

9. An electrode for electrochemical batteries, comprising a homogeneous mixture of comminuted silver with an active material selected from the group which consists of cadmium and cadmium compounds, the silver being present in an amount ranging between substantially 2% and 10%, by weight, of said mixture.

References Cited in the file of this patent

UNITED STATES PATENTS

| | | |
|---|---|---|
| 670,024 | Jungner | Mar. 19, 1901 |
| 2,519,399 | Roberts | Aug. 22, 1950 |
| 2,616,939 | Fischbach | Nov. 4, 1952 |
| 2,646,455 | Jeannin | July 21, 1953 |
| 2,708,683 | Eisen | May 17, 1955 |
| 2,719,874 | Chapman | Oct. 4, 1955 |
| 2,724,732 | Howard | Nov. 22, 1955 |
| 2,727,080 | Moulton | Dec. 13, 1955 |
| 2,737,541 | Coolidge | Mar. 6, 1956 |
| 2,773,924 | Brill | Dec. 11, 1956 |
| 2,830,108 | Peters | Apr. 8, 1958 |
| 2,832,813 | Peters | Apr. 29, 1958 |